Oct. 25, 1966     W. OSER     3,281,273
FUEL CELL
Filed May 5, 1961
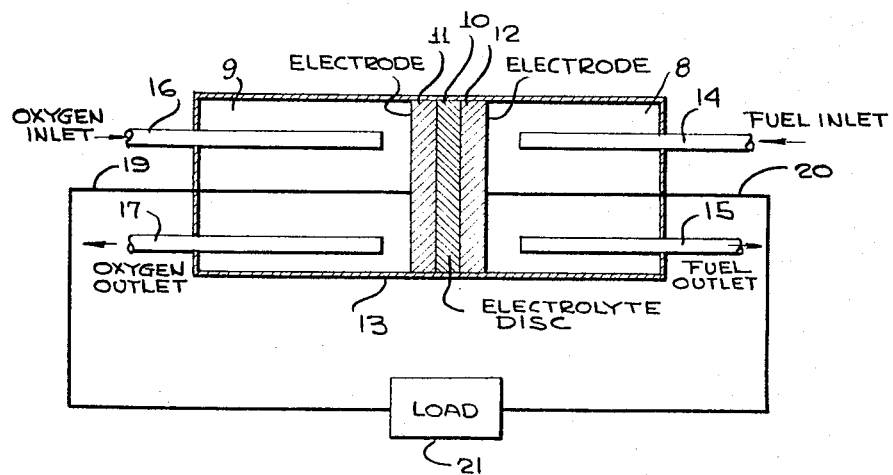
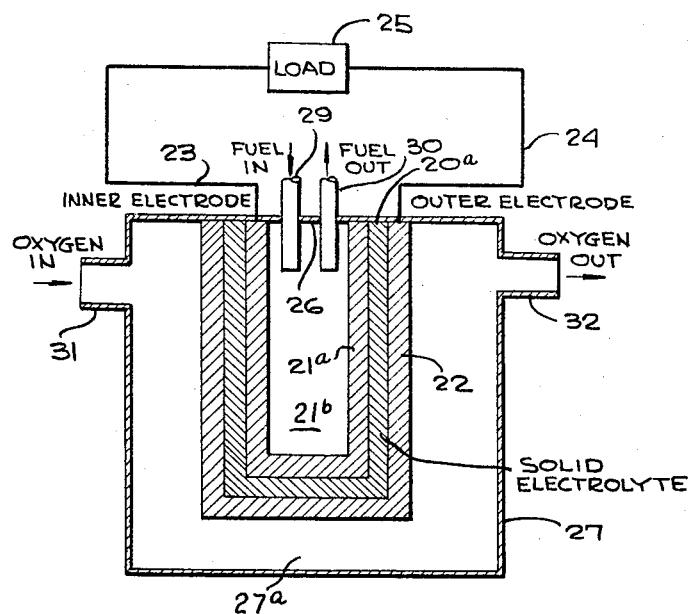
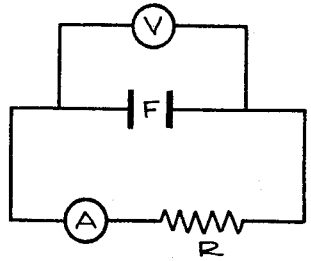
INVENTOR
WILLEM OSER
BY Hurwitz and Rose
ATTORNEYS 3,281,273
FUEL CELL
Willem Oser, Palisades Park, N.J., assignor to Isomet Corporation, Palisades Park, N.J., a corporation of New Jersey
Filed May 5, 1961, Ser. No. 108,185
6 Claims. (Cl. 136—86)

This invention relates to the direct electrochemical conversion of the chemical energy of carbon or of combustible gases into electrical energy.

The theoretical possibility of the conversion of the chemical energy of carbon, such as coal, or of combustible gases, directly into electrical energy electrochemically, is known. The fundamental advantage of such an electrochemical working method as contrasted with the conventionally used thermodynamic conversion is reflected in the relative efficiencies of the two methods. The efficiency of the electrochemical conversion, with reversible conduction of the process, may be brought as close as desired to unity. A comparable efficiency by thermodynamic conversion using a heat engine may only be effected with the use of very great temperature differences, which may not be practically obtained. For this reason, the efficiency of the best modern power stations using heat engines is only approximately 30%.

In the practical realization of the electrochemical conversion, however, considerable difficulties are encountered. The carbon is extremely slow to react at normal temperatures in a fuel cell used for this purpose. In order to avoid a polarization in such a cell, it is necessary for the cell to be operated at considerably increased temperatures of 600° C. and higher.

A great number of attempts and proposals have been made to produce such a fuel cell which is practically operable. None of these attempts, however, have proven successful in practical operation. According to the experience thus far gained, however, it appears most favorable to use solid conductors for the electrolyte of the fuel cell, since the use of liquid electrolytes causes insurmountable difficulties with respect to the fact that the oxygen-contacting electrode must not be moistened by the liquid electrolyte.

As such a solid conductor, a mixture of clay, cerium dioxide in the form of residues from the ignition of monazite, and tungsten trioxide has been suggested by Baur and Preis (Zeitschrift fur Electrochemie, 43, 727, 1937). With the use of this electrolyte, an electromotive force of approximately 0.7 volt may be reached by the cell, this cell being hereinafter referred to as the "Baur cell." This is approximately 70% of the theoretical attainable electromotive force of 1.02 volts. This solid conductor, however, is not satisfactory for practical purposes, since in continuous operation the material undergoes irreversible changes rather rapidly.

Another disadvantage of Baur's cell lies in the fact that a sufficiently low internal resistance is not reached except at very high temperatures of approximately 1100° C. Such high temperatures are extremely disadvantageous in practical operation, since they require a great expenditure for heat insulation in order to keep the heat losses within reasonable limits. In addition, great difficulties are encountered with respect to the material in building up larger elements, and finally, when operating the cell with gases, efficiency is affected by a dissociation of the carbon dioxide occurring at high temperatures as a secondary reaction according to the equation:

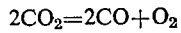

One object of this invention is the direct electrochemical conversion of the chemical energy of carbon or of combustible gases into electrical energy without the above mentioned disadvantages. A further object of this invention is a fuel cell for this electrochemical conversion.

A still further object of this invention is a method for the production of a solid electrolyte for such a fuel cell.

Another object of the invention is to provide a novel crystalline material having a deficient anionic lattice.

A further object of the invention is the provision of methods of fabricating crystalline electrolytic elements having a deficient anionic lattice.

Still a further object of the invention is to provide a method for generating electrical power by means of a fuel cell employing a crystalline lattice having a defective anionic component and a complete cationic component.

These and still further objects will become apparent from the following description, read in conjunction with the drawings, wherein:

FIGURE 1 diagrammatically shows a vertical section of a fuel cell for the direct conversion of the chemical energy of combustible gases to electrical energy;

FIGURE 2 is a diagrammatic showing of a modification of the system of FIGURE 1; and FIGURE 3 is a schematic circuit diagram of a test circuit for the system of FIGURE 1.

It has been found that the chemical energy of carbon or of combustible gases, such as hydrogen, methane and other hydrocarbons and carbon monoxide and mixtures thereof may be directly electrochemically converted into electrical energy by the reaction of the coal or of the gases in a fuel cell which, as contrasted with the known working method with liquid electrolytes, has a solid electrolyte composed of a solid solution of various metal oxides crystallizing with the fluorite structure and having defective anion component lattices. These solid electrolytes are prepared by fusing or sintering mixtures of the oxides having the proper composition. Particularly well suited are mixtures of the tetravalent oxides such as thorium or zirconium oxides and the trivalent oxides such as lanthanum or yttrium oxides. Regarding the fact that a rapid diffusion of the oxygen atoms of the electrolyte is important in the electrochemical process in the electrolyte, it is of advantage, as is known from the theory of ionic conduction, to build many anion lattice defects into the structure. This may be accomplished, for example, by mixing with the tetravalent oxide an amount of trivalent oxide in the tetravalent oxide lattice. A general prescription for this admixture is not given, the exact compositions being dependent on the system chosen.

Electrochemical conversion with the fuel cell of the present invention is effected at temperatures which are lower than the melting point of the solid electrolyte.

The mechanism of reaction and electrolytic conductivity in such a cell is as follows. The tetravalent oxide forms anomalous mixed crystals (solid solutions) with the trivalent oxide in which there are vacant places (holes) distributed statistically at random throughout the anion component lattice. These make is possible for the $O^{--}$ ions to jump from "hole" to "hole" and therefore to migrate in an electric field. As an example, in a solid solution of the system $ZrO_2-Y_2O_3$ with the composition 1 mole $ZrO_2 + 1$ mole $YO_{1.5}$, 25 percent of the anion positions in the statistically random distributions are unoccupied.

The oxygen, either as pure oxygen or oxygen in the air gains two electrons for each oxygen atom fed in at the cathode.

The oxygen, now in the form of $O^{--}$ ions, migrates through the solid electrolyte to the anode where each $O^{--}$ ion reacts with the fuel, liberating two electrons in the process, which electrons then move through any external circuit back to the cathode, thereby causing current to flow in the external circuit.

In summary, the processes in the fuel cell may be expressed by the following scheme (using carbon as the fuel):

Process at the anode:     $2O^{--} + C = CO_2 + 4e^-$
Process at the cathode:   $O_2 + 4e^- = 2O^{--}$
Total process               $\overline{C + O_2 = CO_2 + A}$ where A represents the work which must be spent by the transport of 4 negative elementary charges against the force of the electrical field or which is given off by the cell. Quantitatively it corresponds to approximately the thermal energy evolved in the combustion of the carbon.

In a similar way, the reactions may be expressed for the use of combustible gases, such as hydrogen. Here, the corresponding reaction scheme is as follows:

Process at the anode:     $2O^{--} + 2H_2 = 2H_2O + 4e^-$
Process at the cathode:   $O_2 + 4e^- = 2O^{--}$
Total process               $\overline{2H_2 + O_2 = 2H_2O}$ The method of preparation of the solid solution ceramic electrolyte disc, or other shaped element, is of critical importance since the conductivity of the electrolyte disc is directly dependent upon the crystal structure and lattice defects incorporated in the crystal. In addition, the composition of the ceramic disc must be controlled within certain limits, since the conductivity is dependent on the composition. Indeed, the difference between these solid electrolytes and those used by Baur and Preis (Z. Elektrochem. 43,727(1937); 44,695(1938) lies exactly in the preparation of a very pure, well-defined crystal structure with reproducible lattice defects. In previous work, Baur and Preis attempted to prepare similar types of electrolytes but used impure oxides to start with and used various clays as bonding agents. As a result, they produced materials having an undefined structure that did not possess a sufficient electrolytic conductivity at reasonable temperatures (1000° C.) and did not prove to be invariant against the reducing action of coke or fuel gases such as hydrogen and carbon dioxide. In contrast, the solid solution ceramic electrolytes of well-defined structure that I have produced possess a high electrolytic conductivity at reasonable temperatures and are stable against the reducing action of coke or fuel gases such as hydrogen and carbon monoxide.

The solid electrolyte is prepared in the following manner. Finely ground particles of the oxides to be used are placed in a suitably shaped mold and pressed to a compact mass of the desired shape. This shape is then fired in a furnace at 1500° C. in an air atmosphere for several hours to cause sintering of the particles. This shape is then cooled, reground, pressed and refired at 1500° C. The progress of the solid state reaction is followed by X-ray analysis. Four or five firings and grinding may be required before the proper crystal structure is obtained.

The following are cited as actual examples of the production of a solid electrolyte disc:

(1) A $ThO_2$–$La_2O_3$ system consisting of 50-mole percent $ThO_2$ and 50-mole percent $La_2O_3$ was ground in an agate mortar and pestle. This combination was selected because the fluorite lattice of $ThO_2$ is capable of forming solid solutions with $La_2O_3$ up to 52-mole percent $La_2O_3$. This mixture was then pressed into the form of a disc 4 mm. thick and 1 inch in diameter. This disc was slowly heated to 1500° C. in an air atmosphere, held at 1500° C. for 5 hours and then slowly cooled to room temperature. Four firings at 1500° C. with pulverizing between firings, of the above mentioned mixture were required before a gas-tight disc possessing the desired single phase fluorite structure was successfully prepared. The latter was verified by structure analyses made with a Geiger counter X-ray spectrometer.

(2) A $ThO_2$–$Y_2O_3$ system consisting of 72-mole percent $ThO_2$ and 28-mole percent $Y_2O_3$ was ground with an agate mortar and pestle. This combination was selected because the fluorite lattice of $ThO_2$ is capable of forming solid solutions with $Y_2O_3$ up to 30-mole percent $Y_2O_3$. This mixture was then pressed into the form of a disc 4 mm. thick and 1" in diameter. This disc was slowly heated to 1500° C. in an air atmosphere, held at 1500° C. for 5 hours and then slowly cooled to room temperature. Four firings at 1500° C. with pulverizing between firings, of the above-mentioned mixture were required before a gas-tight disc possessing the desired single phase fluorite structure was successfully prepared. The latter was verified by structure analyses made with a Geiger counter X-ray spectrometer.

The electrodes can be of any porous, electrically conducting material that will remain chemically stable and retain their structural integrity at the operating temperature of the cell. In one example porous electrodes of sintered silver powder were used.

Experimental results with one cell are shown below, the circuit used for measurement being illustrated in FIGURE 3, wherein:

$F$ = fuel cell
$A$ = ammeter
$V$ = voltmeter
$R$ = external resistor = 100 ohms The solid electrolyte was a disc, 1 inch in diameter, 2 mm. thick having the composition 50-mole percent $ThO_2$ and 50-mole percent $La_2O_3$.

OXIDANT—OXYGEN

| Fuel, City Gas [1] Temperature, ° C. | Open-Circuit Voltage | Closed-Circuit Voltage | Current, Milliamps |
|---|---|---|---|
| 730 | 0.93 | 0.10 | 0.7 |
| 740 | 0.93 | 0.15 | 1.0 |
| 760 | 0.92 | 0.18 | 1.3 |
| 780 | 0.91 | 0.22 | 3.5 |
| 790 | 0.90 | 9.24 | 4.5 |
| 800 | 0.90 | 0.30 | 5.0 |
| 815 | 0.88 | 0.20 | 4.0 |
| 820 | 0.87 | 0.21 | 4.0 |

[1] City Gas Composition: Percent by volume—$CO_2$, 1.4; $O_2$, 5.8; CO, 3.5; $CH_4$, 52.1; $H_2$, 16.7; $N_2$, 19.5. Illuminants 1.0.

FUEL—HYDROGEN, OXIDANT—OXYGEN

| Temperature, ° C. | Open-Circuit Voltage | Closed-Circuit Voltage | Current, Milliamps |
|---|---|---|---|
| 827 | 1.02 | 0.63 | 6.0 |
| 800 | 1.02 | 0.60 | 5.9 |
| 750 | 1.04 | 0.50 | 4.0 |
| 710 | 1.042 | 0.37 | 3.0 |
| 680 | 1.06 | 0.30 | 2.0 |
| 640 | 1.062 | 0.20 | 1.8 |
| 610 | 1.07 | 0.125 | 1.3 |
| 550 | 1.08 | 0.08 | 0.6 |
| 530 | 1.09 | 0.05 | 0.3 |
| 520 | 1.09 | 0.025 | 0.25 |
| 500 | 1.09 | 0.025 | 0.20 |
| 480 | 1.10 | 0.020 | 0.15 |

FUEL—METHANE, OXIDANT—OXYGEN

| Temperature, ° C. | Open-Circuit Voltage | Closed-Circuit Voltage | Current, Milliamps |
|---|---|---|---|
| 560 | 0.4 | ---- | 0.05 |
| 595 | 0.5 | 0.01 | 0.1 |
| 630 | 0.52 | 0.01 | 0.2 |
| 730 | 0.54 | 0.03 | 0.55 |
| 800 | 0.72 | 0.1 | 0.65 |
| 810 | 0.79 | 0.125 | 0.90 |
| 825 | 0.82 | 0.15 | 1.2 |
| 835 | 0.83 | 0.20 | 1.5 |
| 850 | 0.83 | 0.25 | 2.0 |

The configuration of the electrodes and solid electrolyte may take any one of a number of shapes. In one form the electrolyte can be a thin disc between two porous electrodes, the whole fitting in a gas tight manner into a tube as in FIGURE 1 and dividing the tube into two separate chambers 8 and 9. In this figure 10 is an electrolyte disc, arranged and constructed in accordance with the above description (Example 1 or 2) and located between porous cathode and anode electrodes 11 and 12, respectively, within a tube 13. Fuel gas is supplied to the chamber 8 in the tube 13 via conduit 14 and excess fuel gas and reaction products are removed via conduit 15. Oxygen or air is supplied to the chamber 9 in the tube 13 via conduit 16 and excess oxygen or air substantially depleted of oxygen is removed via conduit 17. Leads 19 and 20 are connected to the electrodes 11 and 12, respectively, and provide electrical power to a load 21.

In another form the electrodes and solid electrolyte can be in the form of concentric, cylinders with the electrolyte between the inner and outer electrodes, as in FIGURE 2.

Referring now more particularly to FIGURE 2 of the accompanying drawings, the reference numeral 20a denotes a cylindrical element composed of solid electrolyte prepared according to either one of the above examples. An inner cylindrical electrode 21a (anode) is in contact throughout with the inner surface of electrolytic element 20a, and an outer cylindrical electrode 22 (cathode) is in contact throughout with the outer surface of electrolytic element 20a. The inner and outer electrodes 21a, 22 are supplied with leads 23, 24, leading to an electrical load 25. The electrolytic element 20a and the electrodes 21a, 22 each includes a base but is open at the top. An enclosure 26 for the open top is provided to form a chamber 21b in the electrode 21a, and an enclosure 27 for the entire outer electrode 22 provides a separate chamber 27a. Fuel is supplied to the chamber 21b in the interior of electrode 21a via conduit 29, excess fuel and reaction products leaving via conduit 30. Similarly, oxygen or air is supplied to the chamber 27a in the enclosure 27, i.e., to outer electrode 22, via conduit 31, excess oxygen or air substantially depleted of oxygen being removed via conduit 32.

The material of which the electrodes and electrolytic element are fabricated are in accordance with the discussion hereinabove.

These are merely two of the many possible cell configurations and the applicability of this process should be limited only by the sense of this patent rather than by the specific examples given.

What I claim is:

1. A process for direct electrochemical conversion of chemical energy by reaction of a combustible material with oxygen in a fuel cell having a pair of gas-porous electrodes separated by a gas-tight mixed oxide solid electrolyte having a complete cation lattice and an incomplete anion lattice in a substantially pure, fluorite lattice structure with reproducible lattice defects, said process, comprising introducing oxygen in a region adjacent a first of said electrodes, introducing combustible material in a region adjacent a second of said electrodes, maintaining said electrolyte at temperatures in a range above approximately 600° C., said electrolyte supporting substantially pure conduction of oxygen ions thereacross, whereby oxygen ions react with said combustible material to establish an electropotential difference across said electrodes, and exhausting the product of said reaction from said cell, said electrolyte being stable against the reducing action of said combustible material.

2. The process according to claim 1 wherein said electrolyte comprises a crystalline mixture of oxides from the group consisting of $ZrO_2$, $ThO_2$, $La_2O_3$ and $Y_2O_3$.

3. The process according to claim 2 wherein said electrolyte is maintained in the temperature range from 600° C. to 850° C.

4. A device for the direct electrochemical conversion of chemical energy to electrical energy comprising, in combination, a gas-tight mixed oxide solid electrolyte having a complete cation lattice and an incomplete anion lattice in a substantially pure, fluorite lattice structure with reproducible lattice defects, first and second gas-porous electrodes, said electrodes being separated by said electrolyte and in contact therewith, said electrolyte adapted for operation at temperatures in a range above approximately 600° C., enclosure means containing said solid electrolyte and said electrodes, said enclosure means providing said first and second chambers associated with said first and second electrodes, respectively, means for introducing oxygen into said first chamber in a region adjacent said first electrode, means for introducing combustible material into said second chamber in a region adjacent said second electrode, said electrolyte supporting substantially pure conduction of oxygen ions thereacross, whereby oxygen ions react with said combustible material to establish an electropotential difference across said electrodes, said electrolyte being stable against the reducing action of said combustible material, and means for exhausting the product of said reaction from said enclosure means, said electrodes being adapted for coupling an electrical load thereacross.

5. The combination according to claim 4 wherein said electrolyte comprises a crystalline mixture of oxides from the group consisting of $ZrO_2$, $ThO_2$, $La_2O_3$, and $Y_2O_3$.

6. The combination according to claim 5 wherein said electrolyte is maintained at temperatures in the range from 600° C. to 850° C.

References Cited by the Examiner

Glasstone: Textbook of Physical Chemistry, 2nd ed., April 1946, p. 389.

Jour. Electrochemical Soc., vol. 104, No. 6, June 1957, pages 379–386.

Young: Fuel Cells, Reinhold Publishing Corp., New York, June 1960, pp. 78–79 and 95.

WINSTON A. DOUGLAS, *Primary Examiner.*

JOHN R. SPECK, JOHN H. MACK, *Examiners.*

H. FEELEY, *Assistant Examiner.*

UNITED STATES PATENT OFFICE
CERTIFICATE OF CORRECTION

Patent No. 3,281,273                                October 25, 1966

Willem Oser

It is hereby certified that error appears in the above numbered patent requiring correction and that the said Letters Patent should read as corrected below.

Column 6, line 25, strike out "and said electrodes, said enclosure means providing said" and insert instead -- and said electrodes, said enclosure means providing --.

Signed and sealed this 15th day of October 1968.

(SEAL)
Attest:

Edward M. Fletcher, Jr.                                  EDWARD J. BRENNER
Attesting Officer                                            Commissioner of Patents